(12) United States Patent
Luneau et al.

(10) Patent No.: US 9,422,510 B2
(45) Date of Patent: Aug. 23, 2016

(54) POLYMERIC ACTIVE INGREDIENTS WHICH CONTAIN SULFONATE GROUPS AND IMPROVE PRIMARY WASHING POWER

(71) Applicant: Henkel AG & Co. KGaA, Duesseldorf (DE)

(72) Inventors: Benoit Luneau, Ratingen (DE); Inga Kerstin Vockenroth, Duesseldorf (DE); Quang Ngoc Tran, Marseilles (FR); Trang Phan, Marseilles (FR); Didier Gigmes, Allauch (FR); Denis Bertin, Marseilles (FR)

(73) Assignee: Henkel AG & Co. KGaA, Dusseldorf (DE)

( * ) Notice: Subject to any disclaimer, the term of this patent is extended or adjusted under 35 U.S.C. 154(b) by 0 days.

(21) Appl. No.: 14/717,235

(22) Filed: May 20, 2015

(65) Prior Publication Data

US 2015/0252307 A1    Sep. 10, 2015

Related U.S. Application Data

(63) Continuation of application No. PCT/EP2013/074011, filed on Nov. 18, 2013.

(30) Foreign Application Priority Data

Nov. 22, 2012  (FR) ...................... 12 61144

(51) Int. Cl.
| | | |
|---|---|---|
| *C11D 3/39* | (2006.01) | |
| *C08F 28/02* | (2006.01) | |
| *C11D 3/37* | (2006.01) | |
| *B01J 39/20* | (2006.01) | |
| *C11D 3/00* | (2006.01) | |

(52) U.S. Cl.
CPC ................ *C11D 3/378* (2013.01); *B01J 39/20* (2013.01); *C08F 28/02* (2013.01); *C11D 3/0036* (2013.01)

(58) Field of Classification Search
CPC ............ C11D 3/378; C11D 3/39; C08F 28/02
See application file for complete search history.

(56) References Cited

U.S. PATENT DOCUMENTS

| 4,425,462 A * | 1/1984 | Turner .................. C08F 236/10 |
| | | 507/122 |
| 4,664,839 A | 5/1987 | Rieck |
| 4,820,439 A | 4/1989 | Rieck |
| 2002/0160930 A1 | 10/2002 | Emmerson et al. |
| 2007/0167343 A1* | 7/2007 | Suzuki ..................... C11D 1/04 |
| | | 510/329 |

FOREIGN PATENT DOCUMENTS

| GB | 1464427 | 2/1977 |
| GB | 1473201 | 5/1977 |
| GB | 1473202 | 5/1977 |
| GB | 1473571 | 5/1977 |
| WO | 01/40422 A2 | 6/2001 |
| WO | 2010/024468 A1 | 3/2010 |

OTHER PUBLICATIONS

PCT International Search Report (PCT/EP2013/074011) dated Feb. 24, 2014.

* cited by examiner

*Primary Examiner* — Brian P Mruk

(74) *Attorney, Agent, or Firm* — Thomas G. Krivulka

(57) ABSTRACT

The intention was to improve the primary washing power of washing and cleaning agents in particular towards oily and/or greasy soiling This was achieved substantially by incorporating polymers containing styrenesulfonic acid.

7 Claims, No Drawings

POLYMERIC ACTIVE INGREDIENTS WHICH CONTAIN SULFONATE GROUPS AND IMPROVE PRIMARY WASHING POWER

FIELD OF THE INVENTION

The present invention generally relates to the use of specific polymers containing sulfonate groups for enhancing the primary washing power of washing or cleaning agents when washing textiles or cleaning hard surfaces towards in particular bleach- or enzyme-sensitive soiling, and to washing and cleaning agents which contain such polymers.

BACKGROUND OF THE INVENTION

In addition to the ingredients essential for the washing process such as surfactants and builders, washing agents generally contain further components which may be grouped together under the heading of washing auxiliaries and thus include various groups of active substances such as foam regulators, graying inhibitors, bleaching agents, bleach activators and color-transfer inhibitors. Such auxiliary substances also include substances, the presence of which enhances the washing power of surfactants, without they themselves generally necessarily having pronounced surfactant behavior. The same also applies mutatis mutandis to cleaning agents for hard surfaces. Such substances are often known as detergency boosters.

International patent application WO 2010/024468 A1 discloses polymers containing sulfonate groups which contain proportions of for example up to 30 wt. % which originate from the monomer 3-allyloxy-2-hydroxypropane sulfonate which, as described therein, are suitable for use as a builder in washing agents.

It has surprisingly been found that specific polymers containing sulfonate groups enhance primary washing power particularly effectively.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Use of polymers obtainable by copolymerizing styrenesulfonic acid and/or the ammonium or alkali metal salts thereof with di- or polyethylenically unsaturated monomers for enhancing the primary washing power of washing or cleaning agents towards soiling when washing textiles or when cleaning hard surfaces.

A method for removing bleach- or enzyme-sensitive soiling from textiles or hard surfaces, in which a washing or cleaning agent and a polymer obtained by copolymerizing styrenesulfonic acid and/or the ammonium or alkali metal salts thereof with di- or polyethylenically unsaturated monomers are used.

A washing or cleaning agent containing a polymer obtainable by copolymerizing styrenesulfonic acid and/or the ammonium or alkali metal salts thereof with a di- or polyethylenically unsaturated monomer.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention provides the use of polymers obtainable by copolymerizing styrenesulfonic acid and/or the ammonium or alkali metal salts thereof with di- or polyethylenically, in particular diethylenically, unsaturated, monomers for enhancing the primary washing power of washing or cleaning agents towards soiling when washing textiles or when cleaning hard surfaces.

The first monomer is preferably selected from p-styrenesulfonic acid and the alkali metal salts thereof, in particular the sodium salt thereof; although the o- and m-isomers may also be considered. The proportion of the polymer originating from the styrenesulfonic acid monomer preferably amounts to at least 60 mol %, in particular 75 mol % to 99 mol %, relative to the polymer.

The second monomer which is di- or polyethylenically unsaturated is preferably a linear or branched-chain hydrocarbon with in particular 4 to 12 carbon atoms. It is preferably selected from the group comprising buta-1,3-diene, isoprene, penta-1,3-diene, hexa-1,3-diene, hexa-1,4-diene, hexa-1,5-diene, hexa-2,4-diene, hepta-1,6-diene, octa-1,7 -diene, the isomers thereof, and mixtures of these. The proportion of the polymer originating from the di- or polyethylenically unsaturated monomer preferably amounts to at most 40 mol %, in particular 1 mol % to 25 mol %, relative to the polymer.

The polymeric active substance preferably has an average molecular weight (here and hereinafter average molecular weights are stated as number averages) in the range from 500 g/mol to 100000 g/mol, in particular from 1000 g/mol to 40000 g/mol.

The present invention also provides a method for removing bleach- or enzyme-sensitive soiling from textiles or hard surfaces, in which a washing or cleaning agent and a stated polymeric active substance are used. This method may be carried out manually or by machine, for example with the assistance of a domestic washing machine or dishwashing machine. It is here possible to use the in particular liquid agent and the active substance simultaneously or in succession. Simultaneous use may be carried out particularly advantageously by using an agent which contains the active substance. Bleach- or enzyme-sensitive soiling should be taken to mean soiling which is conventionally removable by bleaching agents or with the assistance of enzymes.

The active substances used according to the invention can be straightforwardly produced by free-radical polymerization of the ethylenically unsaturated monomers. Polymerization may here be performed as random or block polymerization.

Using the active substances used according to the invention leads to significantly better detachment of in particular bleach- or enzyme-sensitive soiling on hard surfaces and on textiles, including those made of cotton or with a cotton content, than is the case with compounds previously known for this purpose. Alternatively, significant quantities of surfactant can be saved while maintaining the same soil detachment capacity.

Use according to the invention may proceed in the course of a washing or cleaning process in such a manner that the active substance is added to a liquor containing washing or cleaning agent or preferably the active substance is introduced into the liquor as a component of a washing or cleaning agent, wherein the concentration of active substance in the liquor is preferably in the range from 0.01 g/l to 0.5 g/l, in particular from 0.02 g/l to 0.2 g/l.

The present invention accordingly also provides a washing or cleaning agent containing a polymer obtainable by copolymerizing styrenesulfonic acid and/or the ammonium or alkali metal salts thereof with a di- or polyethylenically, in particular diethylenically, unsaturated monomer.

The preferred embodiments with regard to the polymer which have been explained for the use aspect of the invention also apply to the inventive aspects of the method and the washing or cleaning agent. Conversely, the preferred embodiments with regard to the ingredients of the agent which have been explained for the agent aspect of the invention also apply to the inventive aspects of the method and the use.

Washing or cleaning agents which contain an active substance to be used according to the invention or are used together therewith or in the method according to the invention, may contain any other conventional components of such agents which do not interact undesirably with the active substance essential to the invention. An active substance as defined above is preferably incorporated into the washing or cleaning agent in quantities of 0.1 wt. % to 10 wt. %, in particular 0.5 wt. % to 5 wt. %.

It has surprisingly been found that such active substances have a positive influence on the action of certain other washing and cleaning agent ingredients and that conversely the action of the active ingredient is still further enhanced by certain other ingredients. These effects occur in particular with bleaching agents, with enzymatic active substances, in particular proteases and lipases, with water-soluble inorganic and/or organic builders, in particular based on oxidized carbohydrates or polymeric polycarboxylates and with synthetic anionic surfactants of the sulfate and sulfonate type, for which reason it is preferred to use at least one of the stated further ingredients together with the active substance to be used according to the invention.

An agent which contains an active substance to be used according to the invention or is used together therewith or in the method according to the invention, may preferably contain peroxy-based bleaching agent, in particular in quantities in the range from 5 wt. % to 70 wt. %, and optionally bleach activator, in particular in quantities in the range from 2 wt. % to 10 wt. %. The bleaching agents which may be considered are preferably the peroxy compounds generally used in washing agents such as percarboxylic acids, for example dodecane diperacid or phthaloylaminoperoxycaproic acid, hydrogen peroxide, alkali metal perborate, which may assume tetra- or monohydrate form, percarbonate, perpyrophosphate and persilicate, which generally assume the form of alkali metal salts, in particular sodium salts. Such bleaching agents are present in washing agents which contain an active substance used according to the invention preferably in quantities of up to 25 wt. %, in particular up to 15 wt. % and more preferably of 5 wt. % to 15 wt. %, in each case relative to the entire agent, wherein in particular percarbonate is used. The optionally present bleach activator component comprises the conventionally used N- or O-acyl compounds, for example polyacylated alkylenediamines, in particular tetraacetylethylenediamine, acylated glycolurils, in particular tetraacetylglycoluril, N-acylated hydantoins, hydrazides, triazoles, urazoles, diketopiperazines, sulfurylamides and cyanurates, moreover carboxylic anhydrides, in particular phthalic anhydride, carboxylic acid esters, in particular sodium isononanoylphenolsulfonate, and acylated sugar derivatives, in particular pentaacetyl glucose, together with cationic nitrile derivatives such as trimethylammonium acetonitrile salts. In order to avoid interaction with per compounds during storage, the bleach activators may in known manner have been coated with shell substances and/or granulated, wherein tetraacetylethylenediamine granulated with the assistance of carboxymethylcellulose and having an average grain size of 0.01 mm to 0.8 mm, granulated 1,5-diacetyl-2,4-dioxohexahydro-1,3,5-triazine, and/or trialkylammonium acetonitrile formulated in particulate form are more preferred. Such bleach activators are preferably present in washing agents in quantities of up to 8 wt. %, in particular of 2 wt. % to 6 wt. %, in each case relative to the entire agent.

In a preferred embodiment, an agent according to the invention or used in the course of use according to the invention contains synthetic anionic surfactants of the sulfate and/or sulfonate type, in particular alkylbenzenesulfonate, fatty alkyl sulfate, fatty alkyl ether sulfate, alkyl and/or dialkyl sulfosuccinate, sulfofatty acid ester and/or sulfofatty acid disalts, in particular in a quantity in the range from 2 wt. % to 25 wt. %. The anionic surfactant is preferably selected from alkylbenzenesulfonates, alkyl or alkenyl sulfates and/or alkyl or alkenyl ether sulfates, in which the alkyl or alkenyl group has 8 to 22, in particular 12 to 18 C atoms. These are conventionally not individual substances, but instead cuts or mixtures. Among these, those which have a proportion of compounds with longer-chain residues in the 16 to 18 C atom range of over 20 wt. % are preferred.

A further embodiment of such agents involves the presence of nonionic surfactant selected from fatty alkyl polyglycosides, fatty alkyl polyalkoxylates, in particular ethoxylates and/or propoxylates, fatty acid polyhydroxyamides and/or ethoxylation and/or propoxylation products of fatty alkyl amines, vicinal diols, fatty acid alkyl esters and/or fatty acid amides and mixtures thereof, in particular in a quantity in the range from 2 wt. % to 25 wt. %.

Nonionic surfactants which may be considered include the alkoxylates, in particular the ethoxylates and/or propoxylates, of saturated or mono- to polyunsaturated linear or branched-chain alcohols with 10 to 22 C atoms, preferably 12 to 18 C atoms. The degree of alkoxylation of the alcohols is here generally between 1 and 20, preferably between 3 and 10. They may be produced in known manner by reacting the corresponding alcohols with the corresponding alkylene oxides. Fatty alcohol derivatives are in particular suitable, although the branched-chain isomers thereof, in particular "oxo" alcohols, may be used to produce usable alkoxylates. The alkoxylates, in particular ethoxylates, of primary alcohols with linear, in particular dodecyl, tetradecyl, hexadecyl or octadecyl residues and mixtures thereof are accordingly usable. Corresponding alkoxylation products of alkylamines, vicinal diols and carboxamides which correspond to the stated alcohols with regard to the alkyl moiety, are moreover usable. The ethylene oxide and/or propylene oxide insertion products of fatty acid alkyl esters and fatty acid polyhydroxyamides may furthermore be considered. "Alkyl polyglycosides" suitable for incorporation into the agents according to the invention are compounds of the general formula $(G)_n\text{-}OR^{12}$, in which $R^{12}$ means an alkyl or alkenyl residue with 8 to 22 C atoms, G a glycose unit and n a number between 1 and 10. The glycoside component $(G)_n$ is oligomers or polymers of naturally occurring aldose or ketose monomers, in particular including glucose, mannose, fructose, galactose, talose, gulose, altrose, allose, idose, ribose, arabinose, xylose and lyxose. The oligomers consisting of such glycosidically linked monomers are characterized, apart from by the nature of the sugars contained therein, by the number thereof, the "degree of oligomerization". Since it has to be determined analytically, the degree of oligomerization n generally assumes fractional numerical values; these values are between 1 and 10, in the case of preferably used glycosides below a value of 1.5, in particular between 1.2 and 1.4.

Glucose is the preferred monomer building block due to its ready availability. The alkyl or alkenyl moiety $R^{12}$ of the glycosides preferably likewise originates from readily available derivatives of renewable raw materials, in particular from fatty alcohols, although the branched-chain isomers thereof, in particular "oxo" alcohols, may be used to produce usable glycosides. Primary alcohols with linear octyl, decyl, dodecyl, tetradecyl, hexadecyl or octadecyl residues and mixtures thereof are accordingly in particular usable. More preferred alkyl glycosides contain a coconut fatty alkyl residue, i.e. mixtures with substantially $R^{12}$=dodecyl and $R^{12}$=tetradecyl.

Nonionic surfactant is present in agents which contain an active substance used according to the invention or used in the course of use according to the invention preferably in quantities of 1 wt. % to 30 wt. %, in particular of 1 wt. % to 25 wt. %, wherein quantities in the upper part of this range tend to be encountered in liquid detergents while particulate washing agents preferably tend to contain a smaller quantity of up to 5 wt. %.

Instead or in addition, the agents may contain further surfactants, preferably synthetic anionic surfactants of the sulfate or sulfonate type, including for example the above-mentioned alkylbenzenesulfonates, in quantities of preferably not more than 20 wt. %, in particular of 0.1 wt. % to 18 wt. %, in each case relative to the entire agent. Synthetic anionic surfactants which may be mentioned as particularly suitable for use in such agents are alkyl and/or alkenyl sulfates with 8 to 22 C atoms which bear an alkali metal-, ammonium- or alkyl- or hydroxyalkyl-substituted ammonium ion as counteraction. The derivatives of fatty alcohols with in particular 12 to 18 C atoms and the branched-chain analogs thereof, namely "oxo" alcohols, are preferred. The alkyl and alkenyl sulfates may be produced in known manner by reacting the corresponding alcohol component with a conventional sulfation reagent, in particular sulfur trioxide or chlorosulfonic acid, and subsequent neutralization with alkali metal-, armnonium- or alkyl- or hydroxyalkyl-substituted ammonium bases. Usable surfactants of the sulfate type also include the sulfated alkoxylation products of the stated alcohols, namely "ether sulfates". Such ether sulfates preferably contain 2 to 30, in particular 4 to 10, ethylene glycol groups per molecule. Suitable anionic surfactants of the sulfonate type include the a-sulfo esters obtainable by reacting fatty acid esters with sulfur trioxide and subsequent neutralization, in particular the sulfonation products derived from fatty acids with 8 to 22 C atoms, preferably 12 to 18 C atoms, and linear alcohols with 1 to 6 C atoms, preferably 1 to 4 C atoms, and the sulfofatty acids obtained from said sulfonation products by formal saponification. Preferred anionic surfactants are also the salts of sulfosuccinic acid esters, which are also known as alkyl sulfosuccinates or dialkyl sulfosuccinates, and are the monoesters or diesters of sulfosuccinic acid with alcohols, preferably fatty alcohols and in particular ethoxylated fatty alcohols. Preferred sulfosuccinates contain $C_8$ to $C_{16}$ fatty alcohol residues or mixtures thereof. More preferred sulfosuccinates contain an ethoxylated fatty alcohol residue which is in itself a nonionic surfactant. Sulfosuccinates whose fatty alcohol residues are derived from ethoxylated fatty alcohols with a narrow homolog distribution are here more preferred.

Soaps may be considered as further optional surfactant ingredients, wherein suitable soaps are saturated fatty acid soaps, such as the salts of lauric acid, myristic acid, palmitic acid or stearic acid, and soaps derived from natural fatty acid mixtures, for example coconut, palm kernel or tallow fatty acids. In particular, such soap mixtures which are preferred are those which are composed to an extent of 50 to 100 wt. % of saturated $C_{12}$-$C_{18}$ fatty acid soaps and to an extent of up to 50 wt. % of oleic acid soap. Soap is preferably present in quantities of 0.1 wt. % to 5 wt. %. Larger quantities of soap of generally up to 20 wt. % may, however, also be present in particular in liquid agents which contain an active substance used according to the invention.

If desired, the agents may also contain betaines and/or cationic surfactants, which, if present, are preferably used in quantities of 0.5 wt. % to 7 wt. %.

In a further embodiment, the agent contains water-soluble and/or water-insoluble builders, in particular selected from alkali metal aluminosilicate, crystalline alkali metal silicate with a modulus of above 1, monomeric polycarboxylate, polymeric polycarboxylate and mixtures thereof, in particular in quantities in the range from 2.5 wt. % to 60 wt. %.

The agent preferably contains 20 wt. % to 55 wt. % of water-soluble and/or water-insoluble, organic and/or inorganic builders. Water-soluble organic builder substances in particular include those from the class of polycarboxylic acids, in particular citric acid and saccharic acids, and of polymeric (poly-)carboxylic acids, in particular the polycarboxylates obtainable by oxidizing polysaccharides, polymeric acrylic acids, methacrylic acids, maleic acids and copolymers thereof, which may also contain small proportions of polymerizable substances without carboxylic acid functionality incorporated by polymerization. The relative molecular mass of the homopolymers of unsaturated carboxylic acids is in general between 5000 g/mol and 200000 g/mol, that of the copolymers between 2000 g/mol and 200000 g/mol, preferably 50000 g/mol to 120000 g/mol, relative to free acid. One more preferred acrylic acid/maleic acid copolymer has a relative molecular mass of 50000 g/mol to 100000 g/mol. Suitable, albeit less preferred, compounds of this class are copolymers of acrylic acid or methacrylic acid with vinyl ethers, such as vinyl methyl ethers, vinyl esters, ethylene, propylene and styrene, the acid fraction of which amounts to at least 50 wt. %. Terpolymers containing as monomers two carboxylic acids and/or the salts thereof and, as third monomer, vinyl alcohol and/or a vinyl alcohol derivative or a carbohydrate may also be used as water-soluble organic builder substances. The first acidic monomer or the salt thereof is derived from a monoethylenically unsaturated $C_3$-$C_8$ carboxylic acid and preferably from a $C_3$-$C_4$ monocarboxylic acid, in particular from (meth)acrylic acid. The second acidic monomer or the salt thereof may be a derivative of a $C_4$-$C_8$ dicarboxylic acid, wherein maleic acid is more preferred. In this case, the third monomeric unit is fanned by vinyl alcohol and/or preferably an esterified vinyl alcohol. Preferred vinyl alcohol derivatives are in particular those which are an ester of short-chain carboxylic acids, for example of $C_1$-$C_4$ carboxylic acids, with vinyl alcohol. Preferred terpolymers here contain 60 wt. % to 95 wt. %, in particular 70 wt. % to 90 wt. % of (meth)acrylic acid and/or (meth)acrylate, more preferably acrylic acid and/or acrylate, and maleic acid and/or maleate and 5 wt. % to 40 wt. %, preferably 10 wt. % to 30 wt. % of vinyl alcohol and/or vinyl acetate. Particularly preferred terpolymers are here those in which the weight ratio of (meth)acrylic acid and/or (meth)acrylate to maleic acid and/or maleate is between 1:1 and 4:1, preferably between 2:1 and 3:1 and in particular between 2:1 and 2.5:1. Both the quantities and the ratios by weight are here relative to the acids. The second acidic monomer or the salt thereof may also be a derivative of an allylsulfonic acid which is substituted in position 2 with an alkyl residue, preferably with a $C_1$-$C_4$ alkyl residue, or an aromatic residue which is preferably derived from benzene or benzene derivatives. Preferred terpolymers here contain 40 wt. % to 60 wt. %, in particular 45 to 55 wt. % of (meth)acrylic acid and/or (meth) acrylate, more preferably acrylic acid and/or acrylate, 10 wt. % to 30 wt. %, preferably 15 wt. % to 25 wt. % of methallylsulfonic acid and/or methallylsulfonate and, as third monomer, 15 wt. % to 40 wt. %, preferably 20 wt. % to 40 wt. % of a carbohydrate. This carbohydrate may here for example be a mono-, di-, oligo- or polysaccharide, wherein mono-, di- or oligosaccharides are preferred; sucrose is more preferred. Use of the third monomer presumably incorporates predetermined breaking points into the polymer which are responsible for the polymer's good biodegradability. These terpolymers generally have a relative molecular mass of between 1000 g/mol and 200000 g/mol, preferably between 2000 g/mol and 50000 g/mol and in particular between 3000 g/mol and 10000 g/mol. They may be used, in particular for producing liquid agents, in the form of aqueous solutions, preferably in the form of 30 to 50 wt. % aqueous solutions. All the stated polycarboxylic acids are generally used in the form of the water-soluble salts, in particular the alkali metal salts, thereof.

Such organic builder substances are preferably present in quantities of up to 40 wt. %, in particular of up to 25 wt. % and more preferably of 1 wt. % to 5 wt. %. Quantities close to the stated upper limit are preferably used in pasty or liquid, in particular water-containing, agents.

Water-insoluble, water-dispersible inorganic builder materials which are used are in particular crystalline or amorphous alkali metal aluminosilicates, in quantities of up to 50 wt. %, preferably of no more than 40 wt. % and, in liquid agents, in particular from 1 wt. % to 5 wt. %. Among these, washing agent grade crystalline aluminosilicates, in particular zeolite NaA and optionally NaX, are preferred. Quantities close to the stated upper limit are preferably used in solid, particulate agents. Suitable aluminosilicates in particular comprise no particles with a grain size of above 30 μm and preferably consist to an extent of at least 80 wt. % of particles with a size below 10 μm. Their calcium binding capacity, which may be determined as stated in German patent DE 24 12 837, is in the range of from 100 to 200 mg of CaO per gram. Suitable substitutes or partial substitutes for the stated aluminosilicate are crystalline alkali metal silicates, which may be present alone or mixed with amorphous silicates. The alkali metal silicates usable as builders in the agents preferably have a molar ratio of alkali metal oxide to $SiO_2$ of below 0.95, in particular of 1:1.1 to 1:12 and may be in amorphous or crystalline form. Preferred alkali metal silicates are sodium silicates, in particular amorphous sodium silicates, with an $Na_2O:SiO_2$ molar ratio of 1:2 to 1:2.8. Such amorphous alkali metal silicates are commercially obtainable for example under the name Portil®. Those with an $Na_2O:SiO_2$ molar ratio of 1:1.9 to 1:2.8 are added in the course of production preferably as a solid and not in the form of a solution. Preferably used crystalline silicates, which may be present alone or mixed with amorphous silicates, are crystalline phyllosilicates of the general formula $Na_2Si_xO_{2x+i} \cdot yH_2O$, in which x, the "modulus", is a number from 1.9 to 4 and y is a number from 0 to 20 and preferred values for x are 2, 3 or 4. Crystalline phyllosilicates which fall within this general formula are described, for example, in European patent application EP 0 164 514. Preferred crystalline phyllosilicates are those in which x in the stated general formula assumes the values 2 or 3. In particular, both β- and δ-sodium disilicates ($Na_2Si_2O_5 \cdot yH_2O$) are preferred. Virtually anhydrous crystalline alkali metal silicates, produced from amorphous alkali metal silicates, of the above-stated general formula in which x means a number from 1.9 to 2.1 may also be used in agents which contain an active substance to be used according to the invention. A crystalline sodium phyllosilicate with a modulus of 2 to 3, as may be produced from sand and soda, is used in a further preferred embodiment of agents according to the invention. Crystalline sodium silicates with a modulus in the range from 1.9 to 3.5 are used in a further preferred embodiment of washing agents which contain an active substance used according to the invention. The content of alkali metal silicates thereof preferably amounts to 1 wt. % to 50 wt. % and in particular 5 wt. % to 35 wt. %, relative to anhydrous active substance. If alkali metal aluminosilicate, in particular zeolite, is present as an additional builder substance, the content of alkali metal silicate is preferably 1 wt. % to 15 wt. % and in particular 2 wt. % to 8 wt. %, relative to anhydrous active substance. The weight ratio of aluminosilicate to silicate, in each case relative to anhydrous active substance, then preferably amounts to 4:1 to 10:1. In agents which contain both amorphous and crystalline alkali metal silicates, the weight ratio of amorphous alkali metal silicate to crystalline alkali metal silicate preferably amounts to 1:2 to 2:1 and in particular 1:1 to 2:1.

In addition to the stated inorganic builder, further water-soluble or water-insoluble inorganic substances may be present in the agents which contain an active substance to be used according to the invention, used together therewith or in methods according to the invention. Alkali metal carbonates, alkali metal hydrogencarbonates and alkali metal sulfates and the mixtures thereof are suitable in this connection. Such an additional inorganic material may be present in quantities of up to 70 wt. %.

In addition, the agents may contain further components which are conventional in washing or cleaning agents. These optional components in particular include enzymes, enzyme stabilizers, complexing agents for heavy metals, for example aminopolycarboxylic acids, aminohydroxypolycarboxylic acids, polyphosphonic acids and/or aminopolyphosphonic acids, foam inhibitors, for example organopolysiloxanes or paraffins, solvents and optical brighteners, for example stilbene disulfonic acid derivatives. Agents which contain an active substance used according to the invention preferably contain up to 1 wt. %, in particular 0.01 wt. % to 0.5 wt. %, of optical brighteners, in particular compounds from the class of substituted 4,4'-bis-(2,4,6-triamino-s-triazinyl)-stilbene-2, 2'-disulfonic acid, up to 5 wt. %, in particular 0.1 wt. % to 2 wt. %, of complexing agents for heavy metals, in particular aminoalkylenephosphonic acids and the salts thereof and up to 2 wt. %, in particular 0.1 wt. % to 1 wt. %, of foam inhibitors, wherein the stated proportions by weight in each case relate to the entire agent.

Solvents other than water which may be used in particular in liquid agents are preferably those which are water-miscible. These include lower alcohols, for example ethanol, propanol, iso-propanol, and the isomeric butanols, glycerol, lower glycols, for example ethylene and propylene glycol, and the ethers derivable from the stated classes of compounds. The active substances used according to the invention are present in such liquid agents generally in dissolved or suspended form.

The enzymes, which are preferably present, are in particular selected from the group comprising protease, amylase, lipase, cellulase, hemicellulase, oxidase, peroxidase, pectinase and mixtures of these. Protease obtained from microorganisms, such as bacteria or fungi, are primarily considered. It may be obtained in known manner from suitable microorganisms by fermentation processes. Proteases are commercially obtainable for example under the names BLAND, Savinase®, Esperase®, Maxatase®, Optimase®, Alcalase®, Durazym® or Maxapem®. The lipase which may be used may for example be obtained from *Huinicola lanuginosa*, from *Bacillus* species, from *Pseudomonas* species, from *Fusarium* species, from *Rhizopus* species or from *Aspergillus* species. Suitable lipases are commercially obtainable for example under the names Lipolase®, Lipozym®, Lipomax®, Lipex®, Amano®-Lipase, Toyo-Jozo®-Lipase, Meito®-Lipase and Diosynth®-Lipase. Suitable amylases are for example commercially conventional under the names Maxamyl®, Termamyl®, Duramyl® and Purafect® OxAm. The cellulase which may be used may be an enzyme obtainable from bacteria or fungi which has a pH optimum preferably in the weakly acidic to weakly alkaline range from 6 to 9.5. Such cellulases are conventionally commercial under the names Celluzyme®, Carezyme® and Ecostonee. Suitable pectinases are obtainable for example under the names Gamanase®, Pektinex AR®, X-Pect® or Pectaway® from Novozymes, under the name Rohapect UF®, Rohapect TPL®, Rohapect PTE1000, Rohapect MPE®, Rohapect MA plus HC, Rohapect DA12L®, Rohapect 10L®, Rohapect B1L® from AB enzymes and under the name Pyrolase® from Diversa Corp., San Diego, Calif., USA.

Conventional enzyme stabilizers optionally present in particular in liquid agents include amino alcohols, for example mono-, di-, triethanol- and -propanolamine and mixtures thereof, lower carboxylic acids, boric acid, alkali metal borates, boric acid-carboxylic acid combinations, boric acid esters, boronic acid derivatives, calcium salts, for example Ca-formic acid combination, magnesium salts, and/or sulfur-containing reducing agents.

Suitable foam inhibitors include long-chain soaps, in particular behenic soap, fatty acid amides, paraffins, waxes, microcrystalline waxes, organopolysiloxanes and mixtures thereof, which may furthermore contain microfine, optionally silanized or otherwise hydrophobized silica. For use in particulate agents, such foam inhibitors are preferably bound to granular, water-soluble carrier substances.

Polymers which may be used in addition to the active substances essential to the invention and are known to have a soil detachment capacity with regard to polyesters include copolyesters prepared from dicarboxylic acids, for example adipic acid, phthalic acid or terephthalic acid, diols, for example ethylene glycol or propylene glycol, and polydiols, for example polyethylene glycol or polypropylene glycol. Polyesters with a soil detachment capacity which are preferably used include those compounds which, in formal terms, are obtainable by esterifying two monomer moieties, wherein the first monomer is a dicarboxylic acid HOOC-Ph-COOH and the second monomer a diol HO—$(CHR^{11})_a$OH, which may also be present as a polymeric diol H—$(O—(CHR^{11})_a)_b$OH. Ph here means an o-, m- or p-phenylene residue which may bear 1 to 4 substituents selected from alkyl residues with 1 to 22 C atoms, sulfonic acid groups, carboxyl groups and mixtures thereof, $R^{11}$ means hydrogen, an alkyl residue with 1 to 22 C atoms and mixtures thereof, a means a number from 2 to 6 and b a number from 1 to 300. The polyesters obtainable therefrom preferably contain not only monomer diol units —O—$(CHR^{11}—)_a$O— but also polymer diol units —(O—$(CHR^{11}—)_a)_b$O—. The molar ratio of monomer diol units to polymer diol units preferably amounts to 100:1 to 1:100, in particular to 10:1 to 1:10. In the polymer diol units, the degree of polymerization b is preferably in the range from 4 to 200, in particular from 12 to 140. The molecular weight or average molecular weight or the maximum of the molecular weight distribution of preferred polyesters with a soil detachment capacity is in the range from 250 to 100,000, in particular from 500 to 50,000. The acid on which the residue Ph is based is preferably selected from terephthalic acid, isophthalic acid, phthalic acid, trimellitic acid, mellitic acid, the isomers of sulfophthalic acid, sulfoisophthalic acid and sulfoterephthalic acid and mixtures thereof. Where the acid groups thereof are not part of the ester bonds in the polymer, they are preferably present in salt form, in particular as an alkali metal or ammonium salt. Among these, sodium and potassium salts are more preferred. If desired, instead of the monomer HOOC-Ph-COOH, the polyester with a soil detachment capacity may contain small proportions, in particular no more than 10 mol % relative to the proportion of Ph with the above-stated meaning, of other acids which comprise at least two carboxyl groups. These include, for example, alkylene and alkenylene dicarboxylic acids such as malonic acid, succinic acid, fumaric acid, maleic acid, glutaric acid, adipic acid, pimelic acid, suberic acid, azelaic acid and sebacic acid. Preferred diols HO—$(CHR^{11})_a$OH include those in which $R^{11}$ is hydrogen and a is a number from 2 to 6, and those in which a has the value 2 and $R^{11}$ is selected from hydrogen and alkyl residues with 1 to 10, in particular 1 to 3 C atoms. Among the latter-stated diols, those of formula HO—$CH_2$—$CHR^{11}$—OH, in which $R^{11}$ has the above-stated meaning, are more preferred. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol and neopentyl glycol. A more preferred polymeric diol is polyethylene glycol with an average molar mass in the range from 1000 g/mol to 6000 g/mol.

If desired, these polyesters of the composition as described above may also be end group-terminated, wherein end groups which may be considered are alkyl groups with 1 to 22 C atoms and esters of monocarboxylic acids. The end groups attached via ester bonds may be based on alkyl, alkenyl and aryl monocarboxylic acids with 5 to 32 C atoms, in particular 5 to 18 C atoms. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselinic acid, petroselaidic acid, oleic acid, linoleic acid, linolaidic acid, linolenic acid, eleostearic acid, arachidic acid, gadoleic acid, arachidonic acid, behenic acid, erucic acid, brassidic acid, clupanodonic acid, lignoceric acid, cerotic acid, melissic acid, benzoic acid, which may bear 1 to 5 substituents having a total of up to 25 C atoms, in particular 1 to 12 C atoms, for example tert.-butylbenzoic acid, The end groups may also be based on hydroxymonocarboxylic acids with 5 to 22 C atoms, which for example include hydroxyvaleric acid, hydroxycaproic acid, ricinoleic acid, the hydrogenation product thereof, hydroxystearic acid, and o-, m- and p-hydroxybenzoic acid. The hydroxymonocarboxylic acids may in turn be joined to one another via their hydroxyl group and their carboxyl group and thus be repeatedly present in an end group. The number of hydroxymonocarboxylic acid units per end group, i.e. their degree of oligomerization, is preferably in the range from 1 to 50, in particular from 1 to 10. In a preferred development of the invention, polymers of ethylene terephthalate and polyethylene oxide terephthalate, in which the polyethylene glycol units have molar weights of 750 to 5000 and the molar ratio of ethylene terephthalate to polyethylene oxide terephthalate amounts to 50:50 to 90:10, are used in combination with an active substance essential to the invention.

The polymers with a soil detachment capacity are preferably water-soluble, wherein the term "water-soluble" should be taken to mean a solubility of at least 0.01 g, preferably at least 0.1 g of the polymer per liter of water at room temperature and pH 8. Preferably used polymers, however, have a solubility of at least 1 g per liter, in particular at least 10 g per liter, under these conditions.

The production of solid agents according to the invention presents no difficulties and may proceed in known manner, for example by spray drying or granulation, wherein enzymes and any further thermally sensitive ingredients such as for example bleaching agents are optionally subsequently added separately. Agents according to the invention with an elevated bulk density, in particular in the range from 650 g/l to 950 g/l, may preferably be produced by a method comprising an extrusion step.

Agents according to the invention may preferably be produced in the form of tablets, which may be monophasic or multiphasic, single-colored or multicolored and in particular consist of one layer or of two or more, in particular two, layers, by mixing together all the components, optionally for each layer, in a mixer and compression molding the mixture by means of conventional tablet presses, for example eccentric presses or rotary presses, with pressing forces in the range from approximately 50 to 100 kN, preferably 60 to 70 kN. In particular in the case of multilayer tablets, it may be advantageous for at least one layer to be preliminarily compression molded. This is preferably carried out at pressing forces of between 5 and 20 kN, in particular at 10 to 15 kN. In this manner, break-resistant tablets are straightforwardly obtained which nevertheless dissolve sufficiently rapidly under conditions of use and exhibit breaking and flexural strength values usually of 100 to 200 N, but preferably of above 150 N. A tablet produced in this manner preferably has a weight of 10 g to 50 g, in particular of 15 g to 40 g. The tablets may be of any desired three-dimensional shape and may be round, oval or polygonal, wherein intermediate shapes are also possible. Corners and edges are advantageously rounded. Round tablets preferably have a diameter of 30 mm to 40 mm. In particular the size of polygonal or cuboidal tablets, which are predominantly introduced by means of the dispenser for example of a dishwashing machine, is dependent on the geometry and volume of this dispenser. Preferred embodiments have, for example, a base area of (20 to 30 mm)×(34 to 40 mm), in particular of 26×36 mm or of 24×38 mm.

Liquid or pasty agents according to the invention in the form of solutions containing conventional solvents, in particular water, are generally produced by simply mixing the ingredients, which may be introduced into an automatic mixer as an undissolved material or as a solution.

In a preferred embodiment, an agent into which active substance to be used according to the invention is incorporated is liquid and contains 1 wt. % to 15 wt. %, in particular 2 wt. % to 10 wt. %, of nonionic surfactant, 2 wt. % to 30 wt. %, in particular 5 wt. % to 20 wt. %, of synthetic anionic surfactant, up to 15 wt. %, in particular 2 wt. % to 12.5 wt. %, of soap, 0.5 wt. % to 5 wt. %, in particular 1 wt. % to 4 wt. %, of organic builder, in particular polycarboxylate such as citrate, up to 1.5 wt. %, in particular 0.1 wt. % to 1 wt. %, of complexing agents for heavy metals, such as phosphonate, and in addition to optionally present enzyme, enzyme stabilizer, coloring agent and/or scent, water and/or water-miscible solvent.

In a further preferred embodiment, an agent into which active substance to be used according to the invention is incorporated is particulate and contains up to 25 wt. %, in particular 5 wt. % to 20 wt. %, of bleaching agent, in particular alkali metal percarbonate, up to 15 wt. %, in particular 1 wt. % to 10 wt. %, of bleach activator, 20 wt. % to 55 wt. % of inorganic builder, up to 10 wt. %, in particular 2 wt. % to 8 wt. %, of water-soluble organic builder, 10 wt. % to 25 wt. % of synthetic anionic surfactant, 1 wt. % to 5 wt. % of nonionic surfactant and up to 25 wt. %, in particular 0.1 wt. % to 25 wt. %, of inorganic salts, in particular alkali metal carbonate and/or hydrogencarbonate.

EXAMPLES

Example 1

Production of Polymers

Production of Polymer P1

61.1 g of the sodium salt of p-styrenesulfonate (90% by weight) and 7.78 g of isoprene were combined in a Parr metal reactor equipped with a magnetic stirrer with 1.04 g of Bloc-Builder MA® (Arkema) and 190 ml of dimethyl sulfoxide (DMSO), degassed for 15 minutes under argon and then kept under an argon protective atmosphere. Polymerization was carried out for 72 hours at 120° C. The copolymer was precipitated in acetone/water (95/5 vol./vol.), redissolved in water and reprecipitated in acetone, then filtered and washed a number of times with acetone.

$^1$H NMR analysis revealed a monomer building block content for the copolymer of 78 mol % styrenesulfonate and 22 mol % isoprene.

60 g of the resultant poly(styrenesulfonate-stat-isoprene) and 33 g of toluenesulfonohydrazide ([isoprene]/[TSH]=0.5) were combined in a three-necked round-bottomed flask equipped with a magnetic stirrer and a reflux condenser with 350 ml of distilled water, degassed for 15 minutes under argon and then kept under an argon protective atmosphere. Hydrogenation was carried out for 20 hours at 110° C. Polymer P1 was precipitated in acetone, redissolved in water and reprecipitated in acetone, then filtered and washed a number of times with acetone.

$^1$H NMR analysis revealed a degree of hydrogenation of 100%.

Production of Polymer P2

61.1 g of the sodium salt of p-styrenesulfonate (90% by weight) and 7.78 g of isoprene were combined in a Parr metal reactor equipped with a magnetic stirrer with 10.4 g of Bloc-Builder MA® (Arkema) and 190 ml of dimethyl sulfoxide (DMSO), degassed for 15 minutes under argon and then kept under an argon protective atmosphere. Polymerization was carried out for 72 hours at 120° C. The copolymer was precipitated in acetone/water (95/5 vol./vol.), redissolved in water and reprecipitated in acetone, then filtered and washed a number of times with acetone.

$^1$H NMR analysis revealed a monomer building block content for the copolymer of 79 mol % styrenesulfonate and 21 mol % isoprene.

60 g of the resultant poly(styrenesulfonate-stat-isoprene) and 33 g of toluenesulfonohydrazide ([isoprene]/[TSH]=0.5) were combined in a three-necked round-bottomed flask equipped with a magnetic stirrer and a reflux condenser with 350 ml of distilled water, degassed for 15 minutes under argon and then kept under an argon protective atmosphere. Hydrogenation was carried out for 15 hours at 110° C. Polymer P2 was precipitated in acetone, redissolved in water and reprecipitated in acetone, then filtered and washed a number of times with acetone.

$^1$H NMR analysis revealed a degree of hydrogenation of 100%.

Production of Polymer P3

61.1 g of the sodium salt of p-styrenesulfonate (90% by weight) and 4.54 g of isoprene were combined in a Parr metal reactor equipped with a magnetic stirrer with 0.99 g of BlocBuilder MA® (Arkema) and 190 ml of dimethyl sulfoxide (DMSO), degassed for 15 minutes under argon and then kept under an argon protective atmosphere. Polymerization was carried out for 72 hours at 120° C. The copolymer was precipitated in acetone/water (95/5 vol./vol.), redissolved in water and reprecipitated in acetone, then filtered and washed a number of times with acetone.

$^1$H NMR analysis revealed a monomer building block content for the copolymer of 87 mol % styrenesulfonate and 13 mol % isoprene.

60 g of the resultant poly(styrenesulfonate-stat-isoprene) and 23 g of toluenesulfonohydrazide ([isoprene]/[TSH]=0.5) were combined in a three-necked round-bottomed flask equipped with a magnetic stirrer and a reflux condenser with 350 ml of distilled water, degassed for 15 minutes under argon and then kept under an argon protective atmosphere. Hydrogenation was carried out for 20 hours at 110° C. Polymer P3 was precipitated in acetone, redissolved in water and reprecipitated in acetone, then filtered and washed a number of times with acetone.

$^1$H NMR analysis revealed a degree of hydrogenation of 100%.

Production of Polymer P4

60 g of the sodium salt of p-styrenesulfonate were combined in a Parr metal reactor equipped with a magnetic stirrer with 1.03 g of BlocBuilder MA® (Arkema), 0.04 g of free SG1 nitroxide (Arkema) and 200 ml of dimethyl sulfoxide (DMSO), degassed for 15 minutes under argon and then kept under an argon protective atmosphere. Polymerization was carried out for 3 hours at 110° C.

60 g of this polystyrenesulfonate were combined in a Parr metal reactor equipped with a magnetic stirrer with 12 ml of 1,4-isoprene and 200 ml of DMSO, degassed for 15 minutes under argon and then kept under an argon protective atmosphere. Copolymerization was carried out for 72 hours at 120° C. The copolymer was precipitated in acetone, redissolved in water and reprecipitated in acetone, then filtered and washed a number of times with acetone.

$^1$H NMR analysis revealed a monomer building block content for the copolymer of 77 mol % styrenesulfonate and 23 mol % isoprene.

43 g of the resultant poly(styrenesulfonate-block-isoprene) and 25 g of toluenesulfonohydrazide ([isoprene]/[TSH]=0.5) were combined in a three-necked round-bottomed flask equipped with a magnetic stirrer and a reflux condenser with 300 ml of distilled water, degassed for 15 minutes under argon and then kept under an argon protective atmosphere. Hydrogenation was carried out for 20 hours at 110° C. Polymer P4 was precipitated in acetone, redissolved in water and reprecipitated in acetone, then filtered and washed a number of times with acetone.

$^1$H NMR analysis revealed a degree of hydrogenation of 100%.

Production of Polymer P5

60 g of the sodium salt of p-styrenesulfonate were combined in a Parr metal reactor equipped with a magnetic stirrer with 10.3 g of BlocBuilder MA® (Arkema), 0.04 g of free SG1 nitroxide (Arkema) and 200 ml of dimethyl sulfoxide (DMSO), degassed for 15 minutes under argon and then kept under an argon protective atmosphere. Polymerization was carried out for 2 hours at 110° C.

60 g of this polystyrenesulfonate were combined in a Parr metal reactor equipped with a magnetic stirrer with 12 ml of 1,4-isoprene and 200 ml of DMSO, degassed for 15 minutes under argon and then kept under an argon protective atmosphere. Copolymerization was carried out for 72 hours at 120° C. The copolymer was precipitated in acetone, redissolved in water and reprecipitated in acetone, then filtered and washed a number of times with acetone.

$^1$H NMR analysis revealed a monomer building block content for the copolymer of 76 mol % styrenesulfonate and 24 mol % isoprene.

60 g of the resultant poly(styrenesulfonate-block-isoprene) and 33 g of toluenesulfonohydrazide ([isoprene]/[TSH]=0.5) were combined in a three-necked round-bottomed flask equipped with a magnetic stirrer and a reflux condenser with 350 ml of distilled water, degassed for 15 minutes under argon and then kept under an argon protective atmosphere. Hydrogenation was carried out for 20 hours at 110° C. Polymer P5 was precipitated in acetone, redissolved in water and reprecipitated in acetone, then filtered and washed a number of times with acetone.

$^1$H NMR analysis revealed a degree of hydrogenation of 100%.

Example 2

Washing Agents

TABLE 1

| Washing agent compositions (values stated in wt. %) | | | | | | | | |
|---|---|---|---|---|---|---|---|---|
| | A | B | C | D | E | F | G | H |
| $C_{9-13}$ alkylbenzene sulfonate, sodium salt | 9 | 10 | 6 | 7 | 5 | 15 | 15 | 9 |
| $C_{12-18}$ fatty alcohol with 7 EO | 8 | 9 | 6 | 7 | 5 | 6 | 11 | 10 |
| $C_{12-14}$ fatty alcohol sulfate with 2EO | – | – | 8 | 7 | 10 | 2 | 2 | 5 |
| $C_{12-18}$ fatty acid, sodium salt | 4 | 3 | 3 | 3 | 4 | 2 | 4 | 7 |
| Citric acid | 2 | 3 | 3 | 2 | 2 | 2 | 2 | 3 |
| Sodium hydroxide, 50% | 3 | 3 | 2 | 3 | 3 | 3 | 3 | 4 |
| Boric acid | 1 | 1 | 1 | 1 | 1 | 1 | 1 | 1 |
| Enzymes (amylase, protease, cellulase) | + | + | + | + | + | + | + | + |
| Perfume | 1 | 0.5 | 0.5 | 1 | 1 | 1 | 1 | 1 |
| Propanediol | – | – | – | – | – | 5 | 5 | – |
| Ethanol | 1.5 | 1.5 | 1.5 | 1.5 | 1.5 | 1.5 | 1.5 | 5 |
| PVA/maleic acid copolymer | 0.1 | – | 0.1 | – | – | – | – | – |
| Optical brightener | – | 0.1 | – | 0.1 | 0.2 | 0.2 | 0.2 | 0.2 |
| Opacifier | 0.2 | – | – | – | – | – | – | – |
| Phosphonic acid, sodium salt | 0.5 | 0.5 | 0.5 | 0.5 | 0.5 | 0.5 | 0.5 | 0.5 |
| Polymer essential to the invention | 2 | 2 | 2 | 2 | 2 | 2 | 2 | 2 |
| Water | | | | to 100 | | | | |

Example 3

Washing Tests

Domestic washing machines (Miele® W 1514) were loaded with 3.5 kg of clean accompanying laundry and with cotton test textiles provided with standardized soiling (A: whole egg/pigment; B: blood; C: blood/milk/ink; D: chocolate milk/soot; E: cocoa; F: chocolate mousse) and soil ballast. 75 ml of cleaning agent C listed in example 2 comprising one of the polymers produced in example 1 were dispensed into the machines and washing was performed at 40° C. After drying by hanging and mangling of the test textiles, the whiteness thereof was determined by spectrophotometry (Minolta® CR200-1). Table 2 below shows the differences in the remission values relative to a washing agent of otherwise identical composition which did not contain a polymer essential to the invention as means from 4 determinations and the error in the quadruple determination (LSD).

TABLE 2

| Washing results (values stated in %) | | | | | | |
|---|---|---|---|---|---|---|
| Soiling/polymer | A | B | C | D | E | F |
| P1 | nd | 4.4 | 2.8 | 3.3 | nd | 4.1 |
| P2 | 3.0 | 6.8 | 2.3 | nd | nd | nd |
| P3 | nd | 5.3 | 3.4 | 3.7 | 3.0 | 3.3 |
| P4 | nd | 4.4 | nd | nd | nd | nd |
| P5 | nd | 8.1 | nd | 3.2 | 2.5 | 2.9 |
| LSD | 2.4 | 3.6 | 1.5 | 1.9 | 2.0 | 1.8 | nd = not determined

The washing agents containing an active substance to be used according to the invention exhibited distinctly better primary washing performance than an agent of otherwise identical composition which did not contain such an active substance.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A washing or cleaning agent for washing textiles comprising polymers obtainable by copolymerizing styrenesulfonic acid and/or the ammonium or alkali metal salts thereof with di- or polyethylenically unsaturated monomers, and wherein the agent further comprises from 5 to 70 wt % peroxy-based bleaching agent.

2. The agent according to claim 1 wherein the proportion of the polymers originating from the styrenesulfonic acid monomers amounts to at least 60 mol %, relative to the polymers.

3. The agent according to claim 1 wherein the di- or polyethylenically unsaturated monomers are linear or branched-chain hydrocarbons with 4 to 12 carbon atoms.

4. The agent according to claim 1 wherein the proportion of the polymers originating from the di- or polyethylenically unsaturated monomers amounts to at most 40 mol %, relative to the polymers.

5. The agent according to claim 1 wherein the polymers have an average molecular weight in the range from 500 g/mol to 100000 g/mol.

6. The agent according to claim 1 wherein the polymers are present in quantities of 0.1 wt. % to 10 wt. %.

7. The agent according to claim 1, wherein the di- or polyethylenically unsaturated monomer is selected from the group consisting of buta-1,3-diene, isoprene, penta-1,3-diene, hexa-1,3-diene, hexa-1,4-diene, hexa-1,5-diene, hexa-2,4-diene, hepta-1,6-diene, octa-1,7-diene, the isomers thereof, and mixtures thereof.

* * * * *